United States Patent

Hoffman

[15] 3,707,662
[45] Dec. 26, 1972

[54] MACHINE TOOL VELOCITY CONTROL SYSTEM

[72] Inventor: George A. Hoffman, Racine, Wis.

[73] Assignee: Gettys Manufacturing Company, Incorporated, Racine, Wis.

[22] Filed: Aug. 3, 1970

[21] Appl. No.: 60,693

[52] U.S. Cl..................................318/578, 90/13.5
[51] Int. Cl..............................................G05b 19/36
[58] Field of Search.........................318/578; 90/13.5

[56] References Cited

UNITED STATES PATENTS 2,983,858   5/1961   Herndon...............................318/578
3,573,546   4/1971   Hemery................................318/578
3,582,749   6/1971   Wenzel.................................318/578

Primary Examiner—Bernard A. Gilheany
Assistant Examiner—F. E. Bell
Attorney—Darby & Darby

[57] ABSTRACT

Velocity control means for use in an automatic tracer system in which a stylus is moved relative to a template, comprises a control circuit for maintaining the magnitude of the velocity component in a direction tangential to the template surface (at the point of stylus contact) equal to a predetermined magnitude.

16 Claims, 6 Drawing Figures

INVENTOR.
GEORGE A. HOFFMAN
BY Darby & Darby
ATTORNEYS

INVENTOR.
GEORGE A. HOFFMAN

BY Darby & Darby

ATTORNEYS

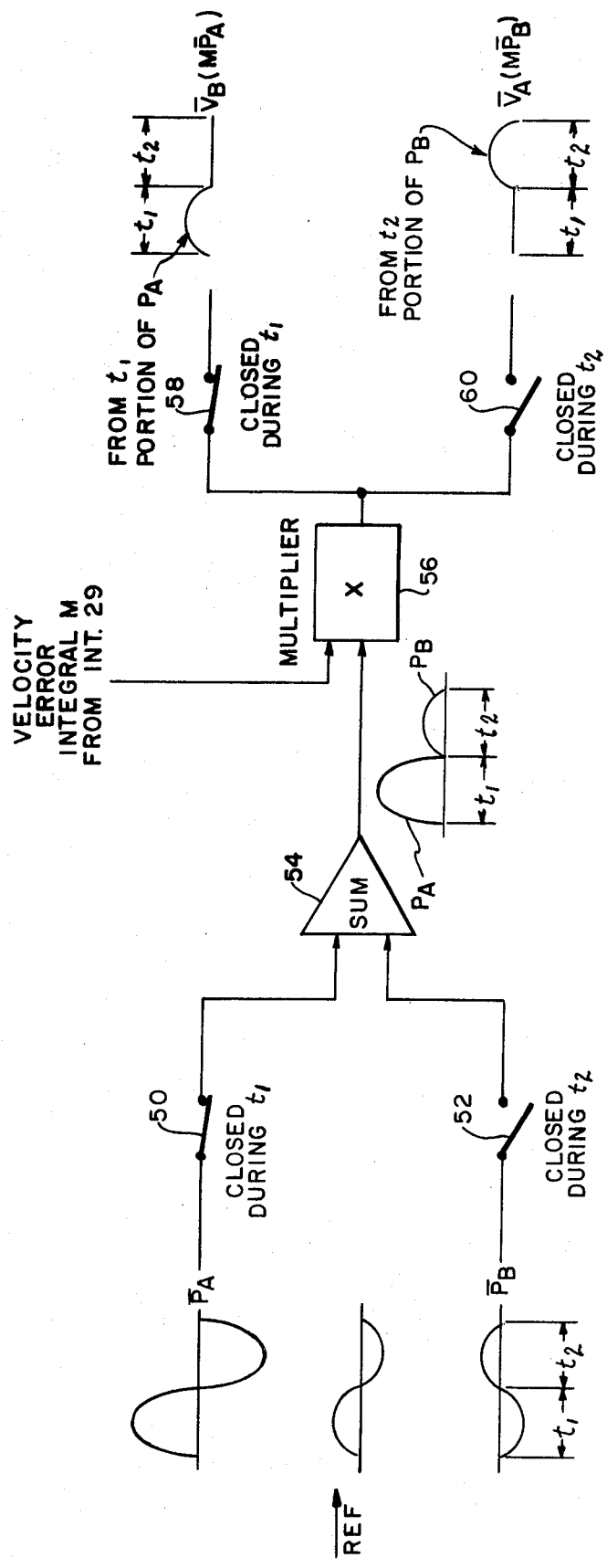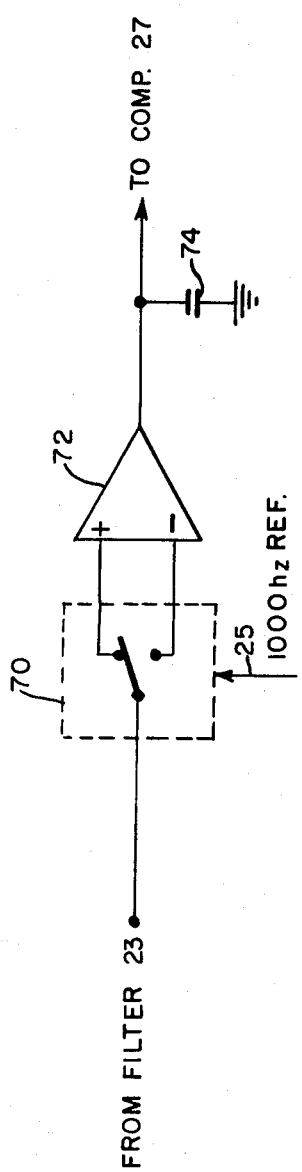
FIG. 5
FIG. 6
INVENTOR.
GEORGE A. HOFFMAN
BY Darby & Darby
ATTORNEYS

MACHINE TOOL VELOCITY CONTROL SYSTEM

This invention relates to automatic tracing devices for use with machine tools. More particularly, this invention relates to velocity control means for use with such automatic tracing devices.

In conventional tracing or profiling devices, deflection of a tracer head stylus from a template produces control signals which cause a tool to be positioned relative to a workpiece so that the tool traces a path, relative to the workpiece, identical to the path of the stylus relative to the template. Conventionally, output signals from the tracer head are proportional in amplitude to stylus deflection along feed and tracer axes (rectangular or polar coordinates) which may be considered as A and B axes. The deflection of the stylus is always perpendicular to the template, and since it is desired to move the stylus tangentially with respect to the template surface, the stylus velocity should always be perpendicular to the direction of stylus deflection.

Although prior art tracer systems can, in theory, trace at a constant velocity, most automatic tracing devices encounter difficulty in progressing consistently at very slow speed rates. For example, when tracing at rates on the order of 0.1 inches per minute or less (e.g., on a large turning machine), the feed rate may change significantly with slight changes in the electric, electronic, or hydraulic components of the tracing system. Such a change in velocity has an adverse effect on the finish of the workpiece.

Moreover, not only is it necessary to control velocity accurately, it is important that the meaningful velocity component be controlled. For example, as noted previously, in the ideal system the velocity vector (stylus relative to template) should be tangential to the template surface at the point of stylus contact. In practice, a quadrature velocity component may be introduced when position loop errors cause stylus deflection to vary from its nominal level or, possibly, when abrupt changes in velocity direction are encountered during tracing. This quadrature velocity component combines with the tangential velocity component to form the actual stylus velocity. Since only tangential velocity is important, control of the actual velocity (including tangential and quadrature components) will not ordinarily suffice to provide the required control of tangential velocity.

A known prior art device (see U.S. Pat. No. 3,452,641 of Hawkins) for controlling velocity in a tracing system includes complex resolving means and fails to account for quadrature velocity components as described above. The present invention is an improvement over this and other such prior art devices both from the viewpoints of simplicity and accuracy.

Briefly, according to the invention, velocity information is derived in the form of direct voltages proportional to respective velocity components along the tracing and feed axes (e.g., from tachometers associated with the tracing servos). These voltages are converted to ac, one is shifted in phase by 90° and the two are then added so that the resultant alternating voltage has an amplitude and phase representative of the actual velocity vector. This resultant voltage is then converted back to a direct voltage proportional only to the magnitude of the tangential velocity component of the actual velocity which is compared to a reference voltage representing the desired tracing speed. The resulting error (if any) is then used to modulate the velocity command signals of the tracing system.

The following explanation of how the above and other objects of this invention are accomplished will be understood with reference to the attached drawings, wherein:

FIGS. 4 and 5 are block diagrams of different embodiments of a motor control circuit which can be used with the basic system of FIG. 2; and FIG. 6 is a diagrammatic illustration of a preferred demodulator used with the system of FIG. 2.

In the following discussion of the various vectors which exist in the system, no material distinction is made between a quantity represented by the vector (i.e., velocity or deflection) and a voltage which can be represented by the same vector, i.e., voltage magnitude represents vector magnitude and voltage phase represents vector direction. To avoid confusion, the same letters are used to represent voltage vectors as used to represent the deflection or velocity associated with that vector. In other words, the vector $\bar{P}$ may be considered as the nominal deflection or as the voltage which represents such nominal deflection. Where it is necessary to distinguish between the voltage and the actual vector represented by the voltage, it is believed that no ambiguity will result in light of the context of the discussion.

Figure 1:
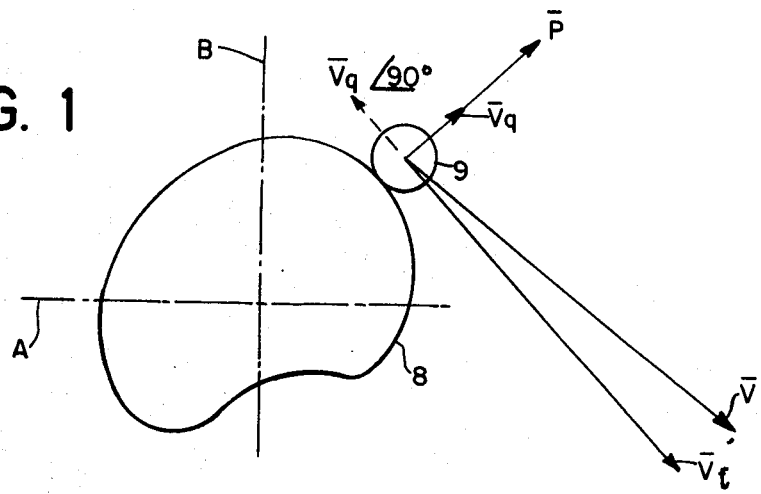
FIG. 1 is a vector diagram used for explanatory purposes.

FIG. 1 is a vector diagram showing the velocity components of the system relative to the nominal deflection of the stylus and is intended solely for explanatory purposes. The template is shown at 8 and the stylus at 9. The stylus may be considered as movable around the template, although it is not material how relative movement is provided. The illustrated vectors are not intended to be an accurate representation of typical vectors which would exist in a tracing system.

Under ideal conditions, stylus 9 is deflected by template 8 in a direction perpendicular to the template surface at the point of contact. This direction is indicated by the vector $\bar{P}$. Vector $\bar{P}$ represents the nominal deflection of the stylus and consists of components along the A and B axes which may be used to control the B and A servos (for example as described in U.S. Pat. No. 3,292,495) to provide the desired tracing. Ideally, the $\bar{P}$ deflection signal will create the velocity vector as indicated by $\bar{V}_t$. The direction of $\bar{V}_t$ is determined by the A and B components of nominal deflection $\bar{P}$ and its magnitude may be determined in a known way by adjustable system parameters. Ideally, $\bar{V}_t$ is the only velocity component present and is always tangential to the template surface. It is velocity $\bar{V}_t$ which must be controlled within narrowly prescribed limits to prevent damaging effects on the finished workpiece.

In practice, the velocity $\bar{V}_t$ is not always the only velocity component present in the system. For example, if for some reason the magnitude of the stylus deflection should exceed its desired nominal level (which, for example, may occur when tracing surfaces having abrupt changes) causing the stylus to "hunt" about its proper nominal level, the tracing system may inherently translate this change in stylus deflection from the desired nominal level into a velocity component which will be in the direction of stylus deflection (i.e., perpendicular to the template). This additional velocity component is a quadrature component and is illustrated in FIG. 1 as $\bar{V}_q$. It is considered a quadrature velocity component since it is 90° out of phase (leading or lagging) with the tangential velocity component $\bar{V}_t$.

Since the system is producing the velocity components $\bar{V}_t$ and $\bar{V}_q$, the actual velocity of the stylus relative to the template is the vector $\bar{V}$ illustrated in FIG. 1. This velocity, of course, will not be precisely tangential to the template surface when $\bar{V}_q$ is present. In this case, if the actual velocity $\bar{V}$ is compared with a reference voltage, an incorrect error signal will result. The present invention, as shown in its preferred embodiment in FIG. 2, avoids this possible error.

Figure 2:
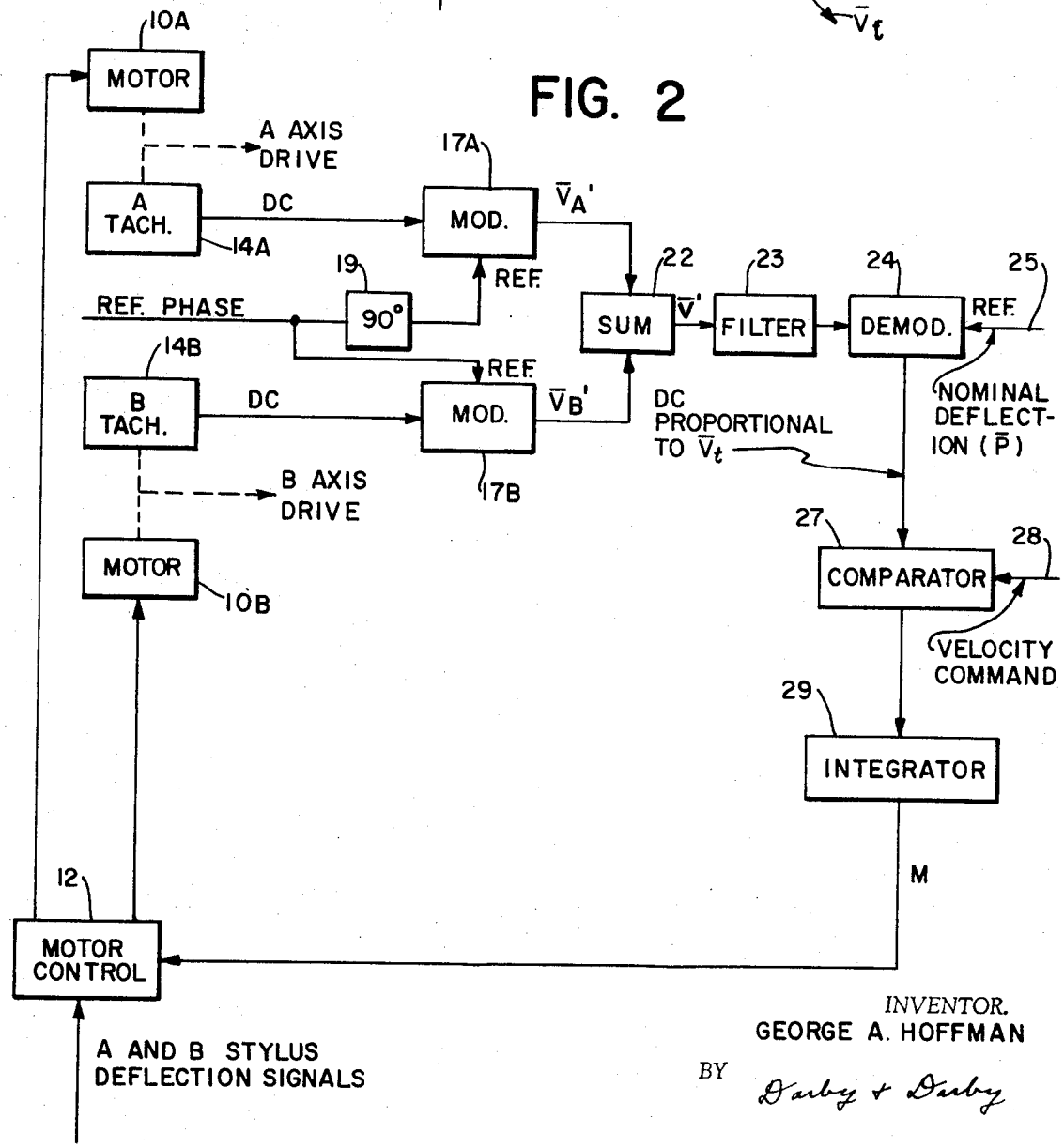
FIG. 2 is a block diagram of the velocity control system of the invention.

The velocity control system of FIG. 2 is intended to be used with the basic tracing system disclosed in assignee's U.S. Pat. No. 3,292,495 and, to the extent an understanding of the basic system is required, that patent is incorporated herein by reference. Of course, the invention is not limited to any particular tracing system.

In this, and other known systems, relative movement between the tracer stylus and the template is provided by a pair of reversible motors 10A and 10B associated with X and Y (or $\rho$ and $\theta$) axes, respectively. For purposes of this description, the coordinates of the basic tracing system are identified by the letters A and B with the understanding that tracing may occur with respect to rectangular or polar coordinates. Motors 10A and 10B are controlled by a motor control circuit 12 which is responsive to the stylus deflection signals from the tracer head. The outputs of motor control circuit 12 are generally direct voltages, the magnitudes of which determine the A and B drives. Since this control circuit may be conventional, it is only shown schematically. It would correspond to the "blocks" 24, 28, 32x and 32y illustrated in FIG. 1 of Hill U.S. Pat. No. 3,292,495. To facilitate this description, the stylus, template, tool and workpiece have been omitted from FIG. 2.

Motors 10A and 10B drive respective DC tachometers 14A and 14B, the DC output voltages of which indicate the magnitudes of stylus velocity along the A and B axes. Since the voltages from tachometers 14A and 14B are thus the A and B components of the actual velocity $\bar{V}$, special means must be provided to examine this vector $\bar{V}$ so that a control or error signal is provided only when the tangential velocity component $\bar{V}_t$ differs from the preselected reference level.

The present invention, as illustrated in block diagram form in FIG. 2, accomplishes this objective by deriving an alternating voltage having a phase and magnitude representative of $\bar{V}$, shifting this voltage 90° in phase, and feeding this shifted voltage to a demodulator in which the reference voltage has a phase which is always representative of the direction of the nominal deflection $\bar{P}$. This is described in detail below with further reference to the vector diagram of FIG. 3.

Figure 3:
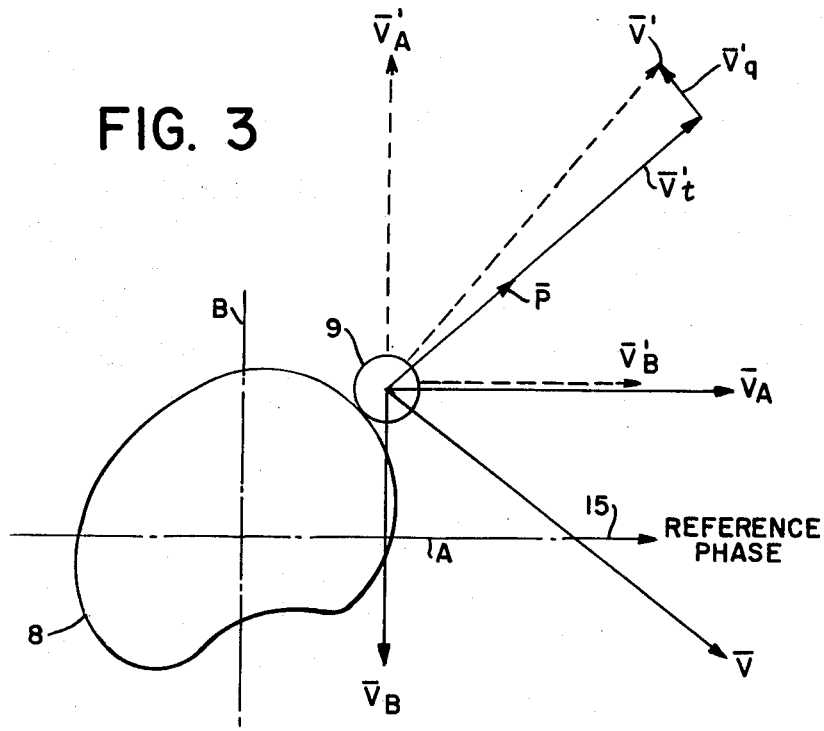

FIG. 3 is a vector diagram similar to FIG. 1 but redrawn for purposes of clarity. In FIG. 3, the actual velocity vector $\bar{V}$ is shown including its A and B components $\bar{V}_A$ and $\bar{V}_B$. Vectors $\bar{V}_A$ and $\bar{V}_B$ represent the velocity components provided by the A and B servos 10A and 10B, respectively.

As is common in tracer systems, the transducer may be driven by an alternating voltage (e.g., 1000Hz), the phase of which may be considered as the reference for the system. In FIG. 3, the vector representing this reference phase is directed along the A axis and is indicated at 15. A voltage representative of vector $\bar{V}_A$ will be in phase with this reference voltage 15 while the voltage corresponding to the velocity vector $\bar{V}_B$ will be 90° out of phase, and leading or lagging the reference depending upon the direction of movement. In FIG. 3, the voltage corresponding to $\bar{V}_B$ is shown lagging $\bar{V}_A$.

The DC outputs of the tachometers 14A and 14B (proportional in magnitude to $\bar{V}_A$ and $\bar{V}_B$) are coupled to respective modulators 17a and 17b in which each DC input is converted to an alternating voltage the phase of which is the same as the phase of the voltage applied at the reference input to the demodulator. The reference voltage which is coupled to the transducer is used to modulate the B tachometer voltage whereby the output of modulator 17B is in phase with the reference voltage 15. This same reference is shifted 90° in phase by a phase shift network 19 and coupled to the reference input of modulator 17A so that the alternating voltage output from modulator 17A lags the reference voltage 15 by 90°. The modulator output voltages are shown in FIG. 3 as the dotted line vectors $\bar{V}_A'$ and $\bar{V}_B'$. The sum of these vectors is the vector $\bar{V}'$ which leads the vector $\bar{V}$ by 90°. This voltage sum is obtained at the output of a summing circuit 22.

Referring back to FIG. 1, it is recalled that the actual velocity vector $\bar{V}$ consists of tangential velocity $\bar{V}_t$ and a quadrature component $\bar{V}_q$. Vector $\bar{V}_t$ is at an angle of 90° relative to the nominal deflection $\bar{P}$, so that if the velocity vector $\bar{V}$ is "rotated" 90° as shown in FIG. 3 (at $\bar{V}'$), the "rotated" tangential velocity component will be aligned directly with the nominal deflection $\bar{P}$ while the "rotated" quadrature component will be transverse to the nominal deflection vector $\bar{P}$. This is illustrated in FIG. 3 by the vectors $\bar{V}_t'$ and $\bar{V}_q'$.

The output of the summing circuit 22 ($\bar{V}'$) is coupled to a filter 23 which removes undesired harmonics and essentially converts the output of the summing circuit into a "clean" sine wave. This sine wave, which represents the velocity $\bar{V}'$ is then coupled to a demodulator 24 in which it is converted to a direct voltage which is only proportional to the magnitude of the tangential velocity $\bar{V}_t$ regardless of the quadrature velocity component.

The demodulator 24 is a known device. It is controlled by a reference input on line 25 and rectifies those components of the input voltage which are in phase (or 180° out of phase) with the reference inputs. The output of the demodulator will be of one polarity if the input and reference voltages are in phase and of opposite polarity if these voltages are out of phase. Thus, the polarity of the demodulator output indicates whether the input voltage ($\bar{V}'$) is leading or lagging the reference ($\bar{P}$) which in turn indicates the direction of the velocity vector.

All voltage components which are 90° out of phase (i.e., in quadrature with) the reference voltage are completely cancelled. As shown in FIG. 2, the reference voltage applied to line 25 is a voltage which is representative of the nominal deflection $\bar{P}$. This reference voltage will ordinarily be available in conventional tracing devices. For example, in Hill U.S. Pat.

No. 3,292,495 this voltage is available directly at the output of the summing amplifier 84 (FIG. 3b).

This direct voltage output of demodulator 24 is thus proportional to the magnitude of tangential velocity $V_t$ and it is coupled to a comparator 27 in which it is compared to a desired velocity command signal on line 28. If a discrepancy exists, an error voltage is produced by the comparator and coupled to an integrator 29 which then appropriately modifies the velocity command signals fed to the motors 10A and 10B by the control circuit 12 so as to reduce the error voltage at the comparator output to zero. When this condition exists the magnitude of tangential velocity $V_t$ will be precisely equal to the desired value.

Figure 4:
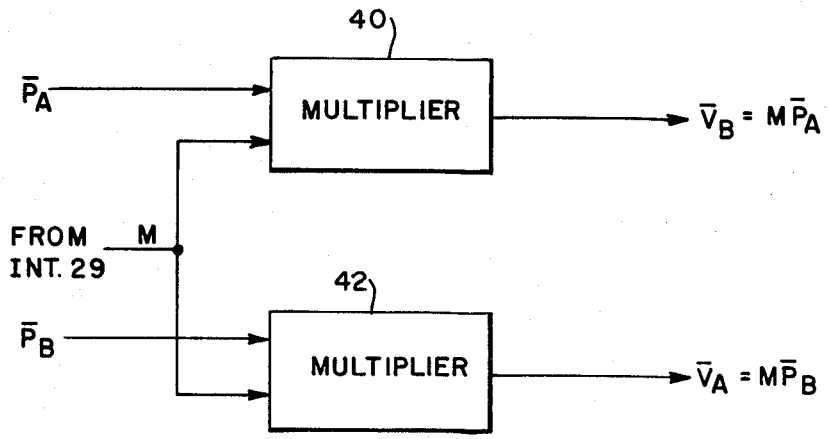

Two different ways in which the error signal can be used to modify the speed control commands to motors 10A and 10B are shown in FIGS. 4 and 5.

FIGS. 4 and 5 correspond specifically to Hill U.S. Pat. No. 3,292,495 in which the A and B components of nominal deflection (shown as $\overline{P}_A$ and $\overline{P}_B$) are used to derive the B and A velocity commands, respectively (shown as $\overline{V}_B$ and $\overline{V}_A$). In FIG. 4, a pair of multipliers 40 and 42 are employed to modify the magnitudes of the $\overline{P}_A$ and $\overline{P}_B$ signals by the error factor (shown as M) derived from integrator 29. The multiplier outputs $M\overline{P}_A$ and $M\overline{P}_B$ would then control the B and A servos (e.g., via lines 118 in Hill U.S. Pat. No. 3,292,495.)

FIG. 5 shows in diagrammatic form an alternative embodiment of the motor control circuit in which only a single multiplier is used. In FIG. 5 switches are illustrated to multiplex the signals. In the preferred embodiment such switches will comprise conventional solid state electronic devices. FIG. 5 is also referenced to the Hill patent (i.e., A and B velocity commands are derived from B and A components, respectively, of nominal deflection).

The voltage waveforms representing the A and B components of nominal deflection $\overline{P}_A$ and $\overline{P}_B$ are shown in FIG. 5 directly to the left of the indicated inputs. In this case the voltage $\overline{P}_B$ has been shifted in phase by 90° so that it is 180° out of phase with the voltage $\overline{P}_A$ which is in phase with the basic system reference voltage.

The voltages $\overline{P}_A$ and $\overline{P}_B$ are coupled to multiplexing switches 50 and 52 which open and close as indicated in the drawing so that the voltages can be combined in a summing circuit 54 to provide a time-shared multiplexed output in which the first half cycle represents the deflection in the A direction and the second half cycle represents the deflection in the B direction. This multiplexed signal is fed to a multiplier 56 where it is modified depending upon the amplitude of the error signal M. The output of multiplier 56 is then fed to a distributor comprising switches 58 and 60 which open and close in synchronism with switches 50 and 52 as indicated on the drawing to provide the $V_B$ and $V_A$ control signals.

The modulator 24 can be a commercially available device. It is diagrammatically illustrated in FIG. 6 to show how the quadrature velocity components are cancelled. In FIG. 6, a mechanical single-pole, double-throw switch is shown at 70 adapted to connect the output from filter 23 to either the positive or negative inputs of a standard operational amplifier 72. The alternating reference signal on line 25 may be considered to cause the common terminal of switch 70 to transfer contacts at each zero axis crossing of the reference voltage. Obviously, in practice, this switch will comprise an electronic device.

When the output from filter 23 is connected to the positive input of amplifier 72, the output of the amplifier is in phase with the applied input. Conversely, when the filter output is coupled to the negative amplifier input, the output voltage is 180° out of phase or of opposite polarity. Thus, if the filter output is directly in phase with the reference voltage on line 25, the positive half cycles will be coupled directly through amplifier 72 while the negative half cycles will be coupled through the amplifier with a phase inversion. Consequently, the output of amplifier 72 will be the rectified input voltage. If the filter output is 180° out of phase with the reference on line 25, amplifier 72 will also rectify the input voltage, but in this case the polarity of the direct voltage output will be opposite that where the input and reference voltages are in phase.

If the input voltage to amplifier 72 contains a component which is exactly 90° out of phase with the reference voltage on line 25, it can be shown that the output of amplifier 72 will produce a corresponding a.c. component which averages out to zero for each cycle of the alternating input voltage. Since a capacitor 74 is connected across the output of amplifier 72, the voltage output of the demodulator (taken across capacitor 74) will only include the rectified alternating voltage components (plus or minus) which are in phase or 180° out of phase with the reference. The quadrature components will not appear across capacitor 74.

The remaining components used will be obvious to those skilled in the art. The integrator is required to ensure that the actual velocity command signals coupled to the A and B motors will be errorless signals. In the preferred embodiment, the integrator may comprise a capacitor with a long time constant. However, it is also contemplated that a motor driven potentiometer be used as an integrator. This type of integrator is illustrated in the above-mentioned Hawkins U.S. Pat. No. 3,452,641. Similarly, the multipliers (see FIGS. 4 and 5) may be either electronic or electromechanical (such as motor driven potentiometers). Where a motor driven potentiometer is employed as a multiplier (either in FIGS. 4 or 5), it is not necessary to use a separate integrator since the motor itself will serve the function of the integrator. The modulators 17A and 17B may operate as "choppers" under the control of a suitable reference voltage in a well-known way. Since the outputs of these choppers are square waves, after the two are combined it is necessary to filter out the fundamental component. In general, the components required to practice the invention do not per se form a part of the invention, which is directed, instead, to the general combinations as defined in the following claims.

What is claimed is:

1. For use in a tracer system wherein a stylus is moved relative to a template with an actual velocity vector as determined by deflection of said stylus from the template, such relative movement being provided by moving means responsive to coordinate control voltages which are dependent upon such deflection, velocity control means for maintaining the magnitude of said velocity vector equal to a predetermined velocity magnitude, comprising means responsive to said moving means for deriving an alternating voltage having an amplitude proportional to the magnitude of said actual velocity vector and a phase dependent upon the direction of said actual velocity vector, means for converting said alternating voltage to a direct voltage, means for comparing the magnitude of said direct voltage with a velocity control voltage having a magnitude proportional to desired velocity, said comparing means producing an error voltage proportional to the difference between said direct voltage and said velocity control voltage, and means responsive to said error voltage for varying said coordinate control voltages to cause the actual velocity to equal the desired velocity.

2. Velocity control means according to claim 1, wherein said direct voltage is substantially dependent only upon the velocity component tangential to the template surface at the point of stylus contact.

3. Velocity control means according to claim 2, wherein said means for converting includes demodulator means responsive to an alternating reference voltage for providing said direct voltage, said demodulator substantially cancelling all voltage components applied thereto which are 90° out of phase with said alternating reference voltage.

4. Velocity control means according to claim 3, wherein the phase of said alternating reference voltage is dependent upon the direction of deflection of said stylus from the template.

5. Velocity control means according to claim 4, wherein the direct voltage produced by said demodulator means has a polarity indicative of the direction of said velocity vector.

6. Velocity control means according to claim 5, wherein the component of said alternating voltage corresponding to said tangential velocity component is substantially in phase or 180° out of phase with said reference voltage, depending upon the direction of said velocity vector.

7. Velocity control means according to claim 6, wherein said tracer system provides an alternating nominal deflection voltage representing the magnitude and direction of stylus deflection, and wherein said alternating reference voltage is in phase with said nominal deflection voltage.

8. For use in a tracer system wherein a stylus is moved relative to a template with an actual velocity vector as determined by deflection of said stylus from the template, such relative movement being provided by moving means responsive to coordinate control voltages which are dependent upon such deflection, velocity control means for maintaining the magnitude of said velocity vector as measured in a direction tangential to the template surface at the point of stylus contact equal to a predetermined desired velocity magnitude, comprising:

means for deriving an alternating voltage having an amplitude proportional to the magnitude of said actual velocity vector and a phase indicative of the direction of said actual velocity vector, means for converting said alternating voltage to a direct voltage, means for comparing the magnitude of said direct voltage with a velocity control voltage having a magnitude proportional to desired velocity, said comparing means producing an error voltage proportional to the difference between said direct voltage and said velocity control voltage, means for integrating said error voltage, and means responsive to said integrated error voltage for adjusting said coordinate control voltages to cause the actual velocity to equal the desired velocity.

9. Velocity control means as recited in claim 8, wherein said means responsive to the stylus output for deriving an alternating voltage having an amplitude proportional to the magnitude of said actual velocity vector and a phase indicative of the direction of said actual velocity vector includes a pair of transducers each having an output voltage proportional to stylus velocity along a single axis, a d.c. to a.c. converter connected to each of said transducer outputs, and means for phase shifting the output of one of said converters 90° relative to the other.

10. A velocity control means as defined in claim 9, wherein said means for converting said alternating voltage to a direct voltage comprises, a demodulator circuit controlled by a reference a.c. signal, said demodulator circuit blocking those voltage components which are 90° out of phase with said reference signal, said direct voltage having an amplitude dependent only upon actual velocity components substantially in said tangential direction and a polarity indicating the direction of said actual velocity.

11. A velocity control means as recited in claim 10, wherein said integrating means comprises a capacitor.

12. A velocity control means as recited in claim 10, wherein said integrating means and said means responsive to said integrated error voltage comprise a motor driven potentiometer.

13. For use in a tracer system wherein a stylus is moved relative to a template with an actual velocity vector as determined by deflection of said stylus from the template, such relative movement being provided by moving means responsive to nominal deflection, velocity control means for maintaining the magnitude of said velocity vector as measured in a direction tangential to the template surface at the point of stylus contact equal to a predetermined desired velocity magnitude, comprising means for deriving an alternating voltage having an amplitude proportional to the magnitude of said actual velocity vector and a phase dependent upon the direction of said actual velocity vector, means for converting said alternating voltage to a direct voltage the amplitude of which is only dependent upon actual velocity components substantially in said tangential direction with the polarity of said direct voltage indicating the direction of said actual velocity, means for comparing the magnitude of said direct voltage with a velocity control voltage proportional to said desired velocity magnitude, said comparing means producing an error voltage proportional to the difference between said direct voltage and said velocity control voltage, and means responsive to said error voltage for adjusting the control voltages coupled to said moving means to cause said velocity vector in said tangential direction to equal the desired velocity.

14. Apparatus according to claim 13, wherein the phase of said alternating voltage is representative of the actual velocity vector rotated 90° in space.

15. Apparatus according to claim 14, wherein said means for converting comprises demodulator means for cancelling voltages 90° out of phase with a reference voltage.

16. Apparatus according to claim 15, wherein the phase of said reference voltage is representative of the direction in which said stylus is deflected.

* * * * *